(12) United States Patent
Häenle et al.

(10) Patent No.: US 7,192,228 B2
(45) Date of Patent: Mar. 20, 2007

(54) DEPTH ADJUSTMENT FOR A CLAMPING CHUCK

(75) Inventors: Peter Häenle, Inzighofen (DE); Klaus Matheis, Sauldorf/Rast (DE); Dieter Gsänger, Bingen (DE)

(73) Assignee: Joerg Guehring, Albstadt (DE)

( * ) Notice: Subject to any disclaimer, the term of this patent is extended or adjusted under 35 U.S.C. 154(b) by 15 days.

(21) Appl. No.: 11/209,125

(22) Filed: Aug. 22, 2005

(65) Prior Publication Data

US 2005/0275170 A1 Dec. 15, 2005

Related U.S. Application Data

(63) Continuation of application No. PCT/DE2004/000381, filed on Feb. 20, 2004.

(30) Foreign Application Priority Data

Feb. 20, 2003 (DE) ................. 103 07 437
Mar. 21, 2003 (DE) ................. 103 12 743

(51) Int. Cl.
*B23Q 11/10* (2006.01)

(52) U.S. Cl. ............ 409/234; 408/56; 279/20; 279/156

(58) Field of Classification Search ........... 408/56, 408/57, 59; 279/20, 156; 409/136, 234; *B23Q 11/10*
See application file for complete search history.

(56) References Cited

U.S. PATENT DOCUMENTS 6,305,696 B1 * 10/2001 Sugata et al. ............... 279/20

| 2002/0053772 | A1 * | 5/2002 | Selb ........................ 279/53 |
| 2005/0258003 | A1 * | 11/2005 | Sugata et al. ............. 184/6.14 |
| 2006/0029479 | A1 * | 2/2006 | Stoll et al. ................ 409/136 |
| 2006/0029480 | A1 * | 2/2006 | Stoll et al. ................ 409/136 |

FOREIGN PATENT DOCUMENTS

| DE | 198 35 677 | | 1/2000 |
| DE | 299 19 555 | | 3/2000 |
| DE | 199 10 710 | | 9/2000 |
| DE | 199 35 960 | | 2/2001 |
| DE | 100 15 322 | | 10/2001 |
| DE | 201 19 639 | | 5/2003 |
| EP | 0 776 728 | | 6/1997 |
| EP | 1 072 356 | B1 | 1/2001 |
| EP | 1072356 | | 1/2001 |
| EP | 1 127 656 | | 8/2001 |
| EP | 1 203 631 | | 5/2002 |
| EP | 1 275 469 | | 1/2003 |
| JP | 08099245 | A * | 4/1996 |
| JP | 2000-42814 | | 2/2000 |
| JP | 2000317768 | A * | 11/2000 |
| JP | 2005212087 | A * | 8/2005 |
| WO | 00/53368 | | 9/2000 |
| WO | 2004/009288 | | 1/2004 |

* cited by examiner

*Primary Examiner*—Daniel W. Howell
(74) *Attorney, Agent, or Firm*—Burr & Brown

(57) ABSTRACT

The invention relates to a clamping chuck for a tool comprising a device for supplying a cooling agent and/or lubricants to a feeding channel of the tool maintained by the clamping chuck. The clamping chuck comprises a sleeve for coupling a feed pipe for supplying a cooling agent and/or lubricants, the sleeve provided with a tubular element and an adjusting screw which is arranged in such a way that it is displaceable with respect to the clamping chuck in the direction of the longitudinal axis thereof.

24 Claims, 2 Drawing Sheets

DEPTH ADJUSTMENT FOR A CLAMPING CHUCK

CROSS-REFERENCE TO RELATED APPLICATIONS

Figure 1:
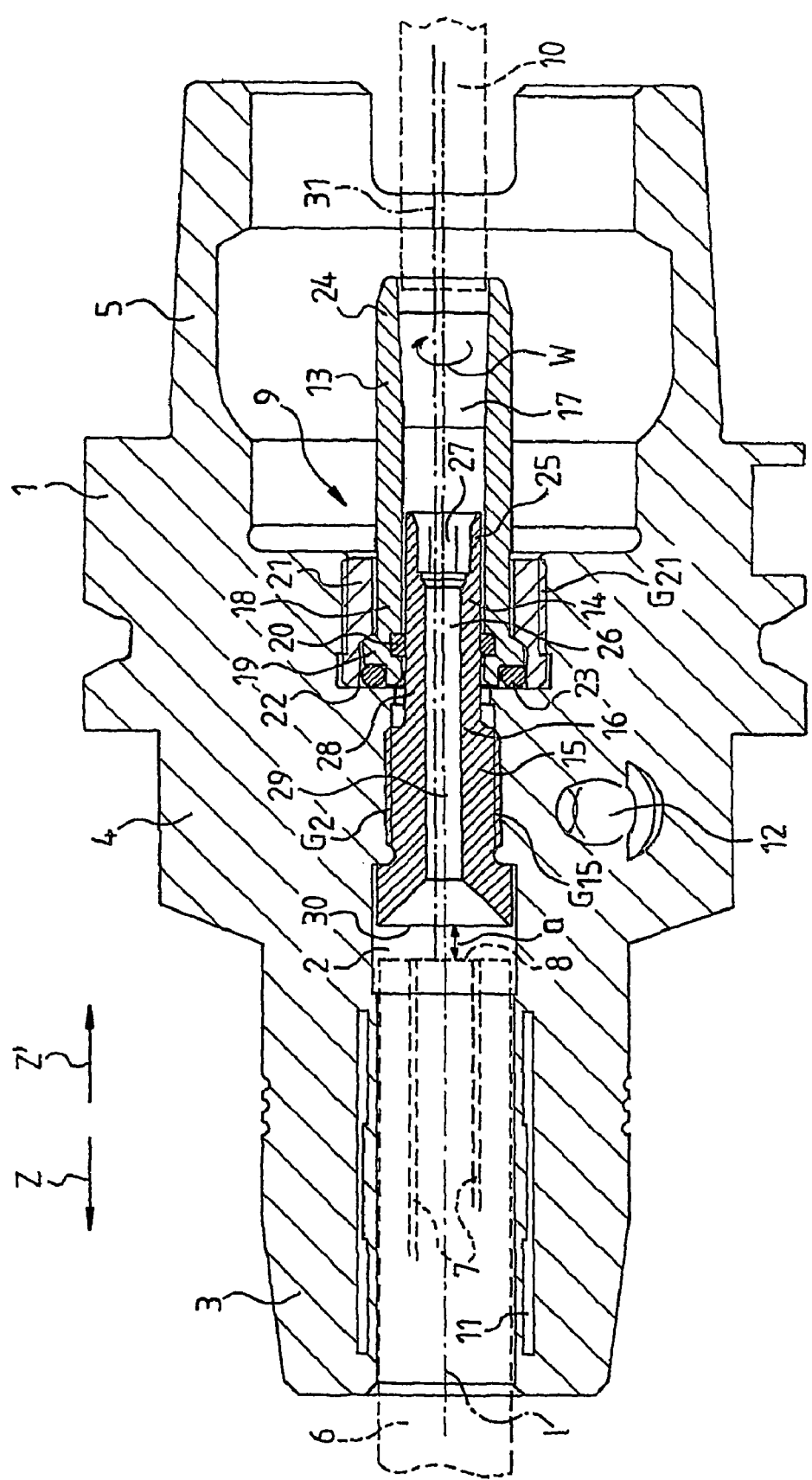

This application is a Continuation of International Application PCT/DE2004/000381, filed Feb. 20, 2004. This application claims the benefit of German Application DE 103 07 437.6, filed Feb. 20, 2003, and German Application DE 103 12 743.7, filed Mar. 21, 2003, the entireties of which are incorporated herein by reference.

FIELD OF THE INVENTION

The invention relates to a clamping chuck for a tool.

BACKGROUND OF THE INVENTION

From DE 199 35 960 A1, a clamping chuck for a tool comprising a device for supplying a coolant or lubricant from a spindle to a tool with a cooling channel is known. Furthermore, from TA 30 8243 01 of the company bielomatik LEUZE GmbH+Co, D-72637 Neuffen, such a clamping chuck is known. It can also be used as a clamping chuck for tools that have to be held in the clamping chuck at various depths and for this purpose are held by means of a shrink connection or by means of a hydro expansion chuck. Supplying a coolant or lubricant to the tool is by way of a sleeve that is firmly screwed to the chuck, to which sleeve lubricant is supplied by the spindle, wherein a tubular nozzle is pressed into this sleeve, which tubular nozzle conveys the lubricant onward to an adjusting screw. In this arrangement, the tubular nozzle or the tubular element is guided in the adjusting screw so as to be longitudinally slidable, and, by way of a rotary key, the adjusting screw is also longitudinally adjustable in the clamping chuck so that the adjusting screw can be rotated so as to contact the tool held in the clamping chuck. The adjusting screw is also used for manually setting the insertion depth of the tool, wherein for the purpose of rotating the adjusting screw, the tubular nozzle and the sleeve have to be deinstalled temporarily. Such temporary deinstallation is also necessary when the setting of the insertion depth takes place automatically with the use of a lance (see e.g. Inductive shrinking device GISS 3000 in the catalogue of the Gühring company: "Präzisions-Schneidwerkzeuge" (precision cutting tools) 2002 edition, page 958) in order to rotate the adjusting screw, following completion of the adjustment process, so that it contacts the tool so as to prevent turbulence in the coolant or lubricant flow in a free space between the adjusting screw and the tool. The state of the art is thus associated with a disadvantage in that the coolant supply arranged in the clamping chuck must be deinstalled and then reinstalled for each readjustment process that is required for the tool.

BRIEF SUMMARY OF THE INVENTION

It is thus the object of the invention to propose a clamping chuck which simplifies and reduces the steps required during initial and repeated adjustment of the insertion depth of a tool.

This object is met by the present invention. Advantageous and expedient improvements are also presented.

The clamping chuck according to one aspect of the invention comprises a tubular element that is longitudinally slidable in the sleeve; that can be activated at the end located in the sleeve by an adjusting tool; and that is connected, having positive or non-positive fit, to the adjusting screw. In this way, it is possible to rotate the adjusting screw, in particular if a suitable engagement shape is provided at the tubular element, directly by means of an adjusting tool that interacts by way of the sleeve with the engagement shape, with an in-line arrangement of the tubular element, without having to deinstall the tubular element and the sleeve to achieve such rotation. This means that after automated adjustment of the insertion depth of a tool, which adjustment is performed in a special device by means of a lance, the adjusting screw can be rotated so as to contact the tool without there being any need to deinstall the sleeve or the tubular element. Similarly, in the case of manual adjustment of the insertion depth of the tool, in which adjustment instead of the lance, the adjusting screw serves as the end stop for determining the insertion depth of the tool, it is possible to rotate the adjusting screw to the desired position using the adjusting tool without deinstalling the sleeve and the tubular element. These advantages are available to the user even in the case where the tool has to be readjusted as a result of wear, in other words where the tool has to be held in the clamping chuck at some other insertion depth.

Furthermore, in one aspect, the invention provides for the tubular element to be nonrotationally glued or screwed to the adjusting screw or to be nonrotationally connected by a corresponding contour. In this way tubular elements of different length and/or different design can quickly be combined with the adjusting screw.

The invention provides for aspects in which the tubular element and the adjusting screw to be designed in one piece, e.g., as a lathed part. A one-piece design of the tubular element and the adjusting screw makes it particularly easy to handle the components; moreover, the transition between the channel arranged in the tubular element and the borehole of the adjusting screw can be designed so as to be optimal from the point of view of fluid technology.

It is advantageous if the adjusting tool reaches through a channel in the sleeve into the engagement shape of the tubular element and is thus rotatable in the channel. This makes it possible to easily adjust the adjusting screw.

One variant of an embodiment according to the invention provides for the tubular element to be held in the sleeve and/or in the adjusting screw so as to be longitudinally adjustable, and for the adjusting screw to be designed for operation by an adjusting tool, wherein the adjusting tool can be brought into engagement from the end opposite the tool through the sleeve and the tubular element and wherein it is freely rotatable in relation to the sleeve and the tubular element. In this way too the already described advantages are achieved. Furthermore, direct interaction between the adjusting tool and the adjusting screw makes it possible to achieve a torque transfer that does not subject the tubular element to any loads so that said tubular element can be designed to be weaker and thus more cost-effective. To this effect the adjusting screw may comprise, for example, an engagement shape for the adjusting tool.

Furthermore, the variant of the embodiment described provides for an aspect in which the sleeve and the tubular element can be designed in one piece so as to reduce the number of hardware components and so as to facilitate the handling or installation of the hardware components.

An expedient design of the subject of the invention provides for the tubular nozzle to be sealed off from the sleeve. This prevents undesirable leakage of coolant or lubricant into the free spaces between the device and the clamping chuck.

For example, the tubular element can be sealed off from the sleeve by means of a contact seal, lip seal or at least an O-ring, wherein the O-ring is held in the sleeve and/or on the tubular element. Such a seal supports longitudinal sliding of the tubular element in the sleeve, as well as repeated decoupling and coupling of the components for maintenance purposes.

The invention provides aspects in which the tubular element or the adjusting screw can comprise an engagement shape, e.g., designed to accommodate a box spanner, such as a hexagonal spanner. In this way, the adjusting tool can interact directly with the tubular element or with the adjusting screw. A box spanner is a particularly slim adjusting tool which can be inserted unerringly through the sleeve.

Furthermore, the invention provides aspects in which the sleeve can be of an internal diameter which at least in sections tapers off toward the tubular element. In this way, the coolant flow or lubricant flow is fed to the tubular element in a nozzle-like way so as to prevent eddies from occurring.

An advantageous embodiment of the subject of the invention provides for the sleeve to be screwed to the clamping chuck by means of a threaded bush or a union nut. In this way, a safe and yet simply disconnectable connection is created which makes it possible to service all the components in an easy way.

Furthermore, the sleeve can be sealed off from the clamping chuck by means of a ring seal. In this way, an effective seal is achieved with very simple means.

The invention also provides aspects in which a through borehole is provided for the adjusting screw to open up in a funnel shape towards the tool. Such a funnel-shaped opening towards the tool makes possible optimum flow and supply of coolant or lubricant to the channels arranged in the tool.

The invention also provides aspects in which the sleeve, the tubular element and the adjusting screw can be made from plastic and/or metal and/or ceramics, and aspects in which the sleeve and/or the tubular element and/or the adjusting screw can be coated. This makes it possible to design the individual components so that they are optimal in view of the requirements they have to meet.

The invention provides aspects in which the sleeve, the tubular element and the adjusting screw can be designed so that they can be penetrated by the adjusting pin of an automatic device for adjusting the position of the tool, wherein the adjusting pin is slidable in the direction of the longitudinal axis of the clamping chuck, e.g. for positioning a tool.

Moreover, the invention provides aspects in which the tubular element can be rotated directly or indirectly by means of the adjusting tool. Direct adjustment makes it possible to directly engage the adjusting tool in the tubular element and thus provides precise adjustability of the tubular element because there is only little play between the interacting components. The use of an adapter between the adjusting tool makes it possible to provide a special engagement shape in the tubular element, while at the same time standard tools can be used as adjusting tools.

The aspects which include a multi-part design of the tubular element from sub-elements made from different materials make it possible to optimally adapt the tubular element to various requirements. For example, in the region of the engagement shape for the adjusting tool the tubular element can be constructed from a torsion-resistant material such as metal, while the region of the face of the tubular element, which face rests against the tool during operation, can be made from a plastic material in order to achieve a particularly good seal toward the tool.

Finally, the invention provides aspects in which the tubular element and the sleeve can be coupled in order to transfer a rotary movement, introduced into the sleeve with the adjusting tool, to the tubular element. This arrangement provides for the tubular element to be longitudinally slidable in relation to the sleeve, while the rotary movement of the sleeve is transferred to the tubular element. Such a design of the two components provides in particular for these two components to be made from different materials, thus optimally adapting them to their respective functions. For example, the sleeve can be made of metal in order to ensure optimum interaction with the adjusting tool, while the tubular element can be made from plastic in order to obtain an optimally sealed connection to the tool. For the purpose of torque transfer, carriers and guide slots in the sleeve or in the tubular element are preferably dimensioned in accordance with the materials characteristics.

Further details of the invention are described below with reference to diagrammatically shown exemplary embodiments.

BRIEF DESCRIPTION OF THE DRAWING FIGURES

The invention may be more fully understood with reference to the accompanying drawings and the following detailed description of the invention.

Figure 2:
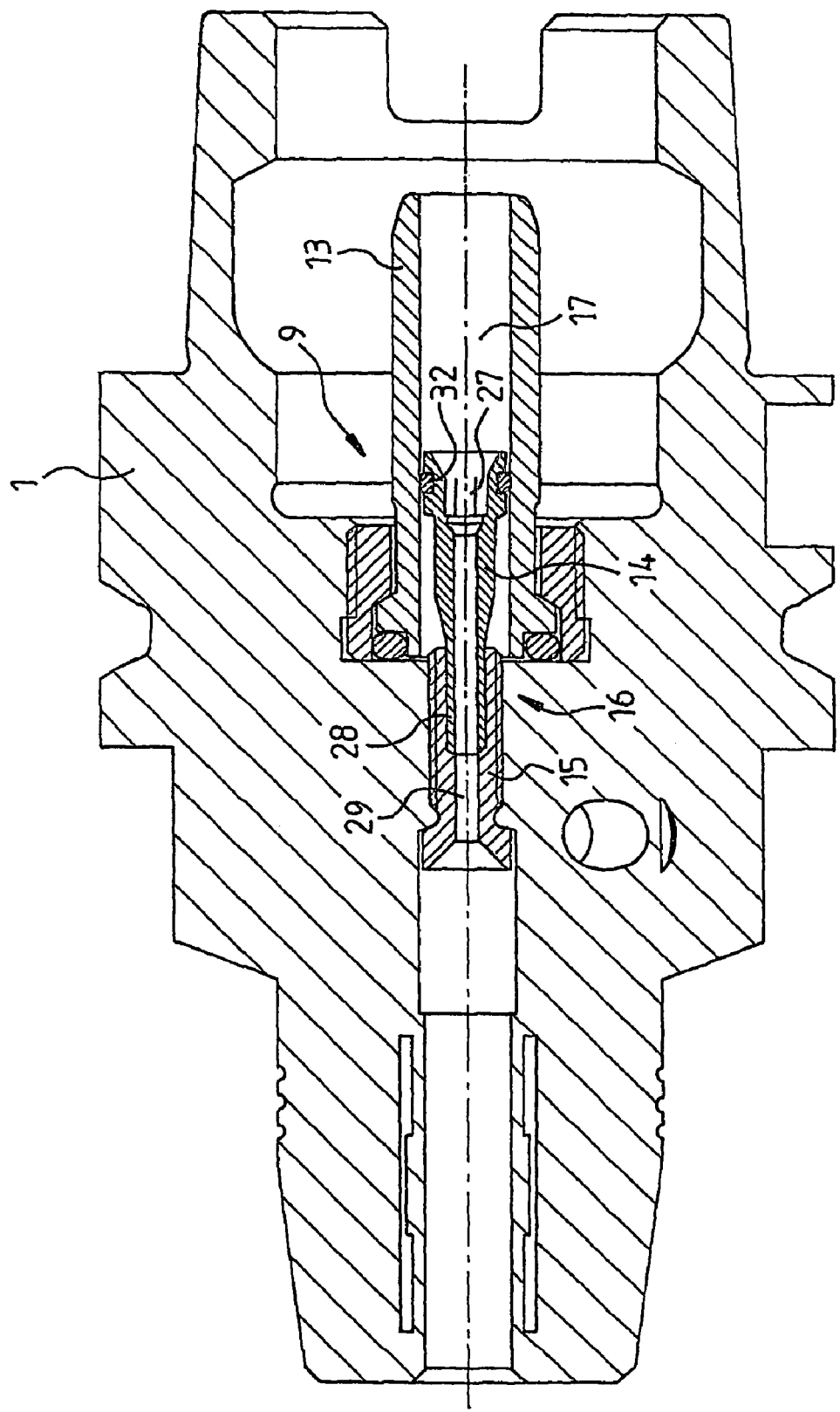

FIG. 1: a section of a clamping chuck in which the tubular nozzle and the adjusting screw are made in one part; and FIG. 2: a section of the clamping chuck shown in FIG. 1, comprising a tubular nozzle which is glued to an adjusting screw.

DETAILED DESCRIPTION OF THE INVENTION

FIG. 1 shows a section of a clamping chuck 1. The clamping chuck 1 comprises a longitudinal axis 1. Along the longitudinal axis 1, a borehole 2 passes through the clamping chuck 1, wherein the diameter of said borehole 2 differs in some sections. The clamping chuck 1 comprises a clamping section 3, a middle section 4 and a coupling section 5. The clamping section 3 is designed to accommodate a tool 6 (indicated by dashed lines) which comprises feeding channels 7 for conveying coolant or lubricant to a tool tip (not shown), which feeding channels 7 lead to a bottom surface 8. Arranged in the middle section 4 in the borehole 2 is a device 9 for supplying a coolant or lubricant to the feeding channels 7 of the tool 6. By way of the coupling section 5, the clamping chuck 1 is coupled to a spindle (not shown) of a machine tool (not shown), wherein the coolant or lubricant is supplied by the spindle to the device 9 by way of a line 10 (shown by a dashed line). The clamping chuck 1 is a so-called hydro expansion chuck in which the tool 6 is hydraulically clamped, wherein the pressure acting on the tool 6 is generated by way of a ring channel 11 positioned in the clamping section 3 of the clamping chuck 1. Increasing and decreasing the pressure is by way of an adjusting screw (not shown) which is arranged in a borehole 12. The device 9 essentially comprises a sleeve 13, a tubular section 14 and an adjusting screw 15, wherein the tubular element 14 and the adjusting screw 15 are made in a single piece as a tube screw 16. The sleeve 13 comprises a through borehole 17. In an end region 18 facing the tool 6, the sleeve 13 comprises a ring-shaped step 19 and in the region of the through borehole 17 comprises an O-ring seal 20. By means of a threaded bush 21 with an external thread $G_{21}$, the sleeve 13 is screwed to the clamping chuck 1, wherein the sleeve 13 is pushed against a wall 22 of the clamping chuck 1 by the threaded bush 21. In this arrangement, the threaded bush 21 exerts pressure on the step 19 of the sleeve 13, while the step 19 is supported by the wall 22 by way of an O-ring seal 23. On a further end section 24, which faces the spindle (not shown), the line 10 leads into the sleeve 13. However, this connection between the sleeve 13 and the line 10 only exists if the clamping chuck 1 is coupled to the spindle. The tubular element 14 is partially inserted into the sleeve 13 and is sealed off from the sleeve 13 by the O-ring seal 20 which is held in the sleeve. On a first end section 25, which faces away from the tool 6, there is a channel 26, formed by the tubular element 14, which serves as an engagement shape 27 for an adjusting tool (not shown). In an end section 28 facing in the direction of the tool 6, the channel 26 of the tubular element 14 gradually changes to a channel 29 which passes through the adjusting screw 15, made in one piece with the tubular element 14, in the direction of the tool 6. The adjusting screw 15 is adjustably guided by an external thread $G_{15}$ in an internal thread $G_2$ of the borehole 2 which leads through the clamping chuck 1. From the position shown in FIG. 1, the tube screw 16 is adjustable in the direction of the arrow z toward the tool 6. This adjustment or longitudinal displacement is carried out by means of the adjusting tool (not shown), which interacts with the receptacle, formed by the engagement shape 27, for a box spanner and rotates the tube screw 16 in relation to the clamping chuck 1 in a direction of rotation w on the longitudinal axis 1. During this movement, the adjusting screw 15 slowly pulls the tubular element 14 of the tube screw 16 into the direction of the arrow x from the sleeve 13, and the adjusting screw 15 slowly moves toward the bottom surface 8 of the tool 6. Readjustment of the adjusting screw 15 or of the tubular element 14 is completed when a face 30 of the adjusting screw 15 closes off so as to provide a seal to the tool 6. After completion of this adjustment movement, the tube screw 16 has been displaced in the direction z by the dimension a so that the tubular element 14 is no longer inserted so deeply in the sleeve 13. The extension required for readjusting the device 1 thus takes place by pulling the sleeve 13 some distance out of the tubular element 14. Rotating the box spanner in the engagement shape 27 in the direction opposite to the direction of rotation w results in withdrawal of the adjusting screw 15 in the direction of the arrow z' and in the device 9 being pushed together or shortened, which takes place by inserting the tubular element 14 deeper into the sleeve 13. In other words, the tube screw 16 is arranged in the sleeve 13 and in the thread $G_2$ so as to be slidable relative to the clamping chuck 1.

Furthermore, the device 9 for automatically adjusting the clamping depth of the tool 6 makes it possible for a lance 31 (only indicated by a dot-dash line) of an automatic tool adjustment device (not shown) to be inserted through the sleeve 13, the tubular element 14 and the adjusting screw 15 so that the latter serves as an end stop for the tool 6. In other words, in the relaxed state of the hydro expansion chuck 1, the tool 6 is moved to the lance 31 and then clamped in the hydro expansion chuck 1 so that it is held at the clamping depth predefined by the lance. Subsequently, the device 9 is adjusted such that the adjusting screw 15 contacts the tool 6.

FIG. 2 again shows the clamping chuck 1 shown in FIG. 1, wherein the tube screw 16 is made in two parts. In FIG. 2, the tube screw 16 comprises a tubular element 14, one end section 28 of which is inserted in a channel 29 of an adjusting screw 15 and is glued to said adjusting screw 15. The tubular element 14 and the adjusting screw 15 are thus interconnected so as to be non-rotating. Rotating a box spanner, which interacts with an engagement shape 27 of the tubular element 14, causes the tubular element 14 and the adjusting screw 15 to rotate and slide together. In a way that additionally differs from the design of the coolant or lubricant transfer set 9 shown in FIG. 1, the tubular element 14 comprises an O-ring seal 32 with which said tubular element 14 can be moved in the through borehole 17 of the sleeve 15.

One embodiment variant (not shown) provides for a box spanner to engage the adjusting screw, and for the channel of the tubular element and the through hole of the sleeve to be dimensioned such that the box spanner can interact through these with the engagement shape.

The invention is not limited to the embodiments shown or described. Instead, it covers improvements of the invention within the scope of the claims for protective rights. In particular it is provided, in the case of a multi-part design of the adjusting screw and the tubular element, to use tubular elements of various lengths in order to design clamping chucks with different dimensions according to the invention. In the case of a single-part design of the adjusting screw and the clamping chuck, accordingly, components of different length are provided.

LIST OF REFERENCE CHARACTERS

1 Clamping chuck
2 Borehole in 2
3 Clamping section of 1
4 Middle section of 1
5 Coupling section of 1
6 Tool
7 Feeding channel in 6
8 Bottom surface of 6
9 Device
10 Line (from the spindle)
11 Ring channel in 1
12 Borehole in 1
13 Sleeve
14 Tubular element
15 Adjusting screw
16 Tube screw
17 Through borehole in 13
18 End region of 13
19 Step on 13
20 O-ring seal of 13
21 Threaded bush
22 Wall
23 O-ring seal between 13 and 1
24 End section of 13
25 End section of 14
26 Channel of 14
27 Engagement shape for adjusting tool in 13
28 End section of 14
29 Channel of 15
30 Face of 15
31 Lance
32 O-ring seal on 14
l Longitudinal axis of 1
$G_2$, $G_{15}$, $G_{21}$ Thread

The invention claimed is:
1. A clamping chuck assembly for clamping a tool and supplying a material selected from the group consisting of coolants and lubricants to a feeding channel of a tool clamped in the clamping chuck assembly, said clamping chuck assembly comprising:

a chuck, said chuck having a longitudinal axis, said chuck comprising a tool-receiving portion for receiving a portion of a tool;

a sleeve positioned in a sleeve-receiving portion of said chuck; and a tube screw comprising a tubular element and an adjusting screw, said tubular element having a first tubular element end and a second tubular element end, said first tubular element end being closer to said tool-receiving portion than said second tubular element end, said adjusting screw being displaceable relative to said chuck along a direction of said longitudinal axis of said chuck, said tubular element being inserted in said sleeve and being slidable in said sleeve along said direction of said longitudinal axis of said chuck, said second tubular element end comprising an engagement shape for engaging with an adjusting tool, said tubular element being nonrotationally connected to said adjusting screw.

2. The clamping chuck assembly according to claim 1, wherein said tubular element is nonrotationally connected to said adjusting screw by a connection selected from the group consisting of being glued to said adjusting screw, being screwed to said adjusting screw, and comprising a contour which prevents rotation of said tubular element in said adjusting screw.

3. The clamping chuck assembly according to claim 1, wherein said tubular element and said adjusting screw consist of a single piece.

4. The clamping chuck assembly according to claim 1, wherein said tubular element comprises a tubular element bore and said sleeve comprises a sleeve bore, said tubular element bore and said sleeve bore being oriented such that an adjusting tool for rotating said tubular element can interact with said engagement shape of said tubular element.

5. A clamping chuck assembly for clamping a tool and supplying a material selected from the group consisting of coolants and lubricants to a feeding channel of a tool clamped in the clamping chuck assembly, said clamping chuck assembly comprising:

a chuck, said chuck having a longitudinal axis, said chuck comprising a tool-receiving portion for receiving a portion of a tool;

a sleeve positioned in a sleeve-receiving portion of said chuck; and a tube screw comprising a tubular element and an adjusting screw, said adjusting screw having a first adjusting screw end and a second adjusting screw end, said first adjusting screw end being closer to said tool-receiving portion than said second adjusting screw end, said adjusting screw being displaceable relative to said chuck along a direction of said longitudinal axis of said chuck, said tubular element being slidably positioned in at least one of said sleeve and said adjusting screw, said adjusting screw being activatable by an adjusting tool acting on said adjusting screw through said sleeve and said tubular element from an end of said chuck opposite to said tool, said adjusting screw being freely rotatable relative to said sleeve and said tubular element.

6. The clamping chuck assembly according to claim 5, wherein said sleeve and said tubular element consist of a single piece.

7. The clamping chuck assembly according to claim 5, wherein a seal is provided between said tubular element and said sleeve.

8. The clamping chuck assembly according to claim 7, wherein said seal comprises at least one O-ring, said O-ring being held at least one of in said sleeve and on said tubular element.

9. The clamping chuck assembly according to claim 7, wherein said seal comprises at least one seal selected from the group consisting of contact seals and lip seals.

10. The clamping chuck assembly according to claim 5, wherein at least one of said tubular element and said adjusting screw comprises an engagement shape.

11. The clamping chuck assembly according to claim 5, wherein said sleeve has an internal diameter which at least in sections tapers off toward said tubular element.

12. The clamping chuck assembly according to claim 5, wherein said sleeve is screwed to said chuck by a threaded bush.

13. The clamping chuck assembly according to claim 5, wherein an O-ring seal is provided between said sleeve and said chuck.

14. The clamping chuck assembly according to claim 5, wherein said adjusting screw comprises a channel which opens up in a funnel shape toward said tool.

15. The clamping chuck assembly according to claim 5, wherein said sleeve, said tubular element and said adjusting screw are made from at least one material selected from the group consisting of plastics, metals and ceramics.

16. The clamping chuck assembly according to claim 5, wherein at least one of said sleeve, said tubular element and said adjusting screw is coated.

17. The clamping chuck assembly according to claim 5, wherein said sleeve, said tubular element and said adjusting screw can accommodate an adjusting pin of an automatic device for adjusting a position of said tool so that said adjusting pin is slidable along said direction of said longitudinal axis.

18. The clamping chuck assembly according to claim 5, wherein said tubular element can be acted on directly or indirectly by said adjusting tool.

19. The clamping chuck assembly according to claim 5, wherein said tubular element comprises at least two sub-elements.

20. The clamping chuck assembly according to claim 19, wherein said sub-elements are made from different materials.

21. The clamping chuck assembly according to claim 10, wherein said engagement shape is provided in said tubular element and is a shape selected from the group consisting of a slot, an internal polyhedral, an internal torx recess and an external polyhedral.

22. The clamping chuck assembly according to claim 10, wherein:

said engagement shape is provided in said tubular element, an adapter is positioned between said engagement shape and said adjusting tool, and said adapter is either removable or remains connected to said tubular element during operation of said clamping chuck assembly.

23. The clamping chuck according to claim 5, wherein an engagement shape for said adjusting tool is provided on said sleeve, and said tubular element is coupled to said sleeve so as to be nonrotational and longitudinally slidable.

24. The clamping chuck according to claim 5, wherein:

said tubular element is guided by at least one carrier in a longitudinal slot of said sleeve, and said sleeve carries said tubular element with it during rotary movement.

* * * * *